(12) United States Patent
Moss

(10) Patent No.: US 7,627,287 B2
(45) Date of Patent: Dec. 1, 2009

(54) ON-CHANNEL REPEATER

(75) Inventor: Peter Neil Moss, Wexham (GB)

(73) Assignee: British Broadcasting Corporation, Kingwood Tadworth (GB)

( * ) Notice: Subject to any disclaimer, the term of this patent is extended or adjusted under 35 U.S.C. 154(b) by 457 days.

(21) Appl. No.: 11/419,059

(22) Filed: May 18, 2006

(65) Prior Publication Data

US 2006/0264174 A1 Nov. 23, 2006

(30) Foreign Application Priority Data

May 20, 2005 (GB) ................... 0510385.8

(51) Int. Cl.
| | |
|---|---|
| H04B 7/14 | (2006.01) |
| H04B 3/36 | (2006.01) |
| H04B 7/185 | (2006.01) |
| H04B 7/17 | (2006.01) |
| H04B 17/02 | (2006.01) |
| H04B 15/00 | (2006.01) |
| H04L 25/20 | (2006.01) |
| H04L 25/52 | (2006.01) |
| H04L 25/60 | (2006.01) |
| H04L 25/64 | (2006.01) |
| H03K 11/00 | (2006.01) |
| H04R 27/00 | (2006.01) |

(52) U.S. Cl. ................ 455/16; 455/7; 455/12.1; 455/24; 375/211; 375/214; 375/350; 381/83; 381/93

(58) Field of Classification Search .......... 455/7, 455/11.1, 12.1, 14, 15, 16, 17, 23, 411, 412.1, 455/413, 436, 456.1, 556, 701, 9, 20, 24; 370/210, 226, 243, 246, 279, 293, 296, 315, 370/341, 335, 492, 501; 375/211, 214, 321, 375/343, 350, 213; 381/93, 83

See application file for complete search history.

(56) References Cited

U.S. PATENT DOCUMENTS

| | | | |
|---|---|---|---|
| 4,317,217 A | * | 2/1982 | Davidson et al. .............. 455/24 |
| 4,383,331 A | | 5/1983 | Davidson |
| 4,453,039 A | | 6/1984 | Ferrieu |
| 4,701,935 A | | 10/1987 | Namiki |
| 4,905,290 A | | 2/1990 | Yaoita |
| 5,091,952 A | | 2/1992 | Williamson et al. |
| 5,168,459 A | | 12/1992 | Hiller |
| 5,259,033 A | | 11/1993 | Goodings et al. |

(Continued)

FOREIGN PATENT DOCUMENTS

EP 0 215 479 B1 9/1991

(Continued)

OTHER PUBLICATIONS

Engebretson et al.: "An Adaptive Feedback Equalization Algorithm For The CID Digital Hearing Aid;" Annual International Conference of the IEEE Engineering in Medicine and Biology Society; vol. 12, No. 5; Mar. 1990; pp. 2286 and 2287.

(Continued)

*Primary Examiner*—Nay A. Maung
*Assistant Examiner*—Paul P Tran
(74) *Attorney, Agent, or Firm*—Daly, Crowley, Mofford & Durkee, LLP

(57) ABSTRACT

An on-channel repeater has a receiving antenna for receiving an RF signal and a transmitting antenna for transmitting on the same frequency as the input signal. An amplification path between the antennas provides substantially linear processing and includes a combiner, a decorrelating delay and a power amplifier. A filter estimator receives a reference signal and the combiner output and generates a plurality of control coefficients which are applied to an adaptive filter which filters the reference signal accordingly and applies its output to the combiner. The reference signal is derived not from the output of the decorrelating delay but rather from the output antenna after the power amplifier. Where there is an adjacent transmitter generating potentially interfering signals, the transmitter output is coupled to the same transmitter antenna.

28 Claims, 3 Drawing Sheets

U.S. PATENT DOCUMENTS

| | | | |
|---|---|---|---|
| 5,323,459 A | 6/1994 | Hirano | |
| 5,450,456 A | 9/1995 | Mueller | |
| 5,559,833 A | 9/1996 | Hayet | |
| 5,680,467 A | 10/1997 | Hansen | |
| 5,748,751 A | 5/1998 | Janse et al. | |
| 5,835,848 A * | 11/1998 | Bi et al. | 455/24 |
| 6,269,165 B1 | 7/2001 | Stott et al. | |
| 6,385,435 B1 | 5/2002 | Lee | |
| 6,999,594 B2 * | 2/2006 | Stott et al. | 381/93 |
| 7,035,321 B2 * | 4/2006 | Balaberda | 375/213 |
| 7,043,203 B2 | 5/2006 | Miquel et al. | |
| 7,346,311 B1 * | 3/2008 | Schwartz | 455/7 |
| 7,398,053 B2 * | 7/2008 | Kerek | 455/20 |
| 2002/0039383 A1 | 4/2002 | Zhu et al. | |
| 2007/0041434 A1 * | 2/2007 | Park et al. | 375/211 |

FOREIGN PATENT DOCUMENTS

| | | |
|---|---|---|
| EP | 0 187 672 B1 | 10/1991 |
| EP | 0 453 203 A2 | 10/1991 |
| EP | 0 453 203 A3 | 10/1991 |
| EP | 0 498 369 A2 | 8/1992 |
| EP | 0 498 369 A3 | 8/1992 |
| EP | 0 613 266 B1 | 8/1994 |
| EP | 0 227 393 B1 | 2/1995 |
| EP | 0 650 277 | 4/1995 |
| EP | 0 653 858 | 5/1995 |
| EP | 0772310 A2 | 7/1997 |
| EP | 0 920 126 A2 | 6/1999 |
| EP | 1 039 716 A1 | 9/2000 |
| EP | 1 039 716 B1 | 4/2003 |
| EP | 0 920 126 | 2/2004 |
| GB | 1 160 271 | 8/1969 |
| GB | 1 247 343 | 9/1971 |
| GB | 2 015 170 A | 9/1979 |
| GB | 2 022 954 | 12/1979 |
| GB | 2 065 421 | 6/1981 |
| GB | 2 295 748 A | 6/1996 |
| GB | 2306082 A | 4/1997 |
| JP | 56079599 | 6/1981 |
| JP | 59214341 | 12/1984 |
| WO | WO 88/00417 | 1/1988 |
| WO | WO 94/09604 | 4/1994 |
| WO | WO 95/05042 | 2/1995 |
| WO | WO 95/07508 | 3/1995 |
| WO | WO 95/28034 | 10/1995 |
| WO | WO 97/16942 | 5/1997 |

OTHER PUBLICATIONS

B. Widrow S.D. Steams: "Adaptive Signal Processing:" 1985, Prentice-Hall, New Jersey, U.S. XP002024439; Chapter 11, see p. 288, line 7—p. 292, line 13; figure 11.24.

UK Search Report for Patent Application No. GB0609933.7 dated Jul. 31, 2006.

EP Search Report for Patent Application No. EP06 25 2591 dated Aug. 10, 2006.

Search Report for GB 9622560.2 under Section 17, UK Patent Office, Jan. 13, 1997.

\* cited by examiner

ON-CHANNEL REPEATER

CROSS REFERENCE TO RELATED APPLICATIONS

This application claims the benefit under 35 U.S.C. §119 of United Kingdom application no. 0510385.8 filed May 20, 2005.

STATEMENT REGARDING FEDERALLY SPONSORED RESEARCH

Not applicable.

BACKGROUND OF THE INVENTION

This invention relates to rebroadcast transceivers which are designed to receive RF (radio frequency) signals, amplify them, and retransmit them onward on the same frequency. Such transceivers are known in the broadcasting field as on-channel repeaters, and are sometimes termed active deflectors.

In an on-channel repeater, due to unwanted coupling or feedback between the receiving and the transmitting antenna, the repeater can also receive its own retransmitted output, thus causing instability and relaxation oscillations. Our International Patent Application WO97/16942 and European Patent Application 772310 (equivalent GB 2306082) describe a method and apparatus which has been found to be surprisingly effective in removing this feedback. In this method there is an amplification path between the input and output antennas which provides substantially linear processing and includes a delay sufficient to decorrelate the output and input. The repeater includes an amplification path providing substantially linear processing without demodulation and decoding, and a filter-estimator responsive to the signal in the amplification path for correlating the signal in the amplification path before the delay with a noise-like signal taken after the delay to produce a plurality of correlation coefficients. The filter estimator may use the least mean square method. An adaptive filter in the form of a transversal filter receives the signal in the amplification path and is controlled by the control coefficients to provide a modified signal, and a combiner combines the modified signal with the signal in the amplification path so as to reduce the effect of the feedback. In this way, unwanted feedback from the output of the active deflector to the input is substantially eliminated. The compensation conveniently makes use of the inherent noise-like property of the signal, as described it is an OFDM signal; however a separate noise signal may be added if necessary.

An example of a transceiver of the type described in our earlier applications is shown in FIG. 1. The transceiver 10 has a receiving antenna 12 which is coupled to an amplification path 14 which includes an adder 16, a decorrelating delay 18, and an amplifier 20. The output of the amplifier is applied to a transmitting antenna 22. The output of the delay 18 is also applied as a reference signal to a filter estimator 24, which also receives the output of adder 16, and an adaptive filter 26, which applies an output to the subtractive or inverting input of adder 16. The construction and operation of the whole of this corrector circuitry 28 is described in detail in our earlier applications. Part of the output of the transmitter antenna will be picked up by the receiving antenna as indicated by the dashed line 30, as unwanted feedback. The corrector 28 removes the effect of this feedback.

An on-channel repeater can be used for two purposes, namely coverage extension and hole filling. Coverage extension is used if the received signal strength is insufficient in a particular area, and the repeater is then used as an additional transmitter, often as a part of a Single Frequency Network (SFN).

In hole-filling, the received signal strength is sufficient, but signals on adjacent channels to the desired signal are so strong that domestic receivers have insufficient dynamic range to demodulate the wanted channel successfully. In extreme cases, in areas very close to adjacent channel transmitters, the intermodulation products from the adjacent channels interfere directly with the wanted signal, even though spectral mask requirements have been fulfilled. The repeater must remove the intermodulation products of co-sited adjacent channels that arrive at its input, as well as removing the unwanted feedback. Referring to FIG. 1, we have appreciated that any interfering signal, illustrated at 32, generated externally to the transceiver may be combined with the transmitter signal as illustrated by the notional combiner 34 and contribute to the unwanted feedback.

FIG. 4 illustrates possible requirements on such a repeater. The figure is a spectral diagram showing the signals in and adjacent a wanted channel at 225.648 MHz when there is a strong signal on the adjacent channel at 227.360 MHz. Typically, the adjacent channel signals can be up to 53 dB larger at the input than the received wanted signal, imposing stringent requirements of selectivity of filters, linearity of mixers and dynamic range of digital-to-analog converters. At its main input, fed from the receiving antenna, the device should cope with a parasitic feedback-to-received signal ratio of up to 35 dB, while the cancellation of this feedback should be at 45 to 50 dB in order not to degrade the signal-to-noise ratio of the recovered signal. According to standard EN50248:2001, Characteristics of DAB Receivers, Section 7.3.3, a consumer DAB receiver must be able to decode a signal surrounded by adjacent channels at +30 dB and cope with any signals 5 MHz away from the centre frequency at +40 dB.

In the known system of our earlier applications referred to above, the input of the adaptive filter is connected internally to the output of the repeater device as described above and shown in FIG. 1. We have appreciated that because this clean internal reference might differ from the actual signal transmitted through the antenna, the signal recovered in the cancellation stage will still contain any products and interferers which are uncorrelated with the reference.

SUMMARY OF THE INVENTION

The invention is defined in the claims below to which reference may now be made.

A preferred embodiment of the invention is described in more detail below with reference to the drawings. This embodiment takes the form of an on-channel repeater which has a feedback signal that enables cancellation of any uncorrelated parasitic signal arriving at the receiving antenna which was present in the transmit antenna feed, not just the recovered version of the wanted signal. In order to avoid instability caused by parasitic coupling between the receiving and transmitting antennas, stray transmitted signals are cancelled by an adaptive filter. Whereas previously this filter has processed the retransmitted signal obtained internally in the repeater and tried to model the external parasitic feedback, in the present invention it uses external feedback from the transmitting antenna feed, that includes any distortion, intermodulation products and interference from adjacent channels.

BRIEF DESCRIPTION OF THE DRAWINGS

The invention will now be described in more detail by way of example with reference to the accompanying drawings, in which.

DETAILED DESCRIPTION OF THE PREFERRED EMBODIMENTS

Figure 1:
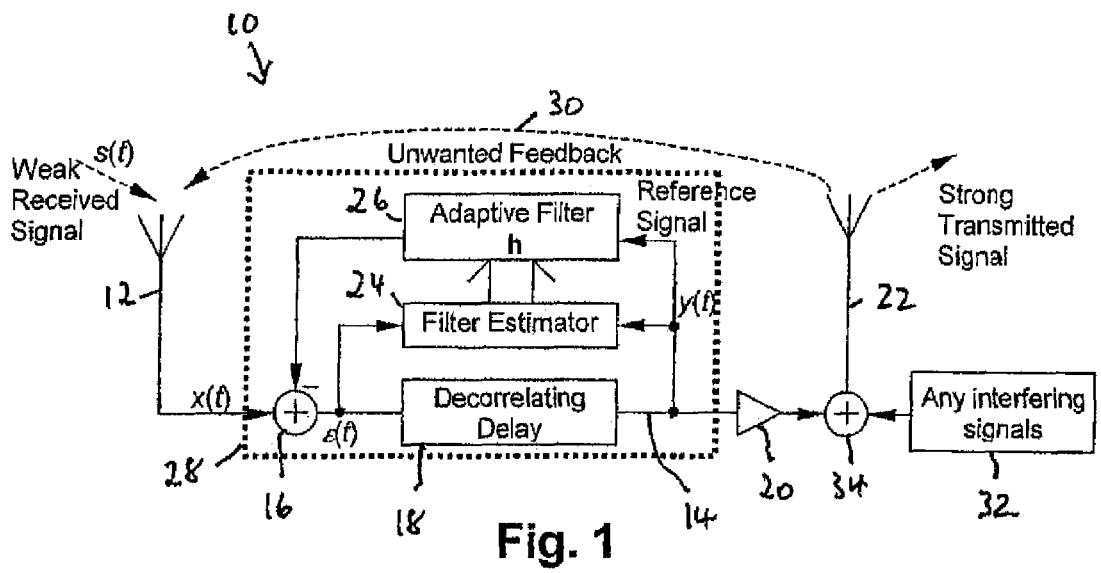
FIG. 1 (described above) is a block diagram of a known on-channel repeater as described in our earlier applications.

An on-channel repeater 36 embodying the invention will now be described in more detail. Referring to FIG. 2, much of the structure of the processor 38 is as described for the processor 28 of FIG. 1. That is to say the transceiver 36 has a receiving antenna 12 which is coupled to an amplification path 14 which includes an adder 16, a decorrelating delay 18, and an amplifier 20. The output of the amplifier is applied to a transmitting antenna 22. A reference signal is applied to a filter estimator 24, which also receives the output of adder 16, and an adaptive filter 26, which applies an output to the subtractive or inverting input of adder 16. The filter estimator 24 generates filter coefficients which are applied to the adaptive filter 26.

Figure 2:
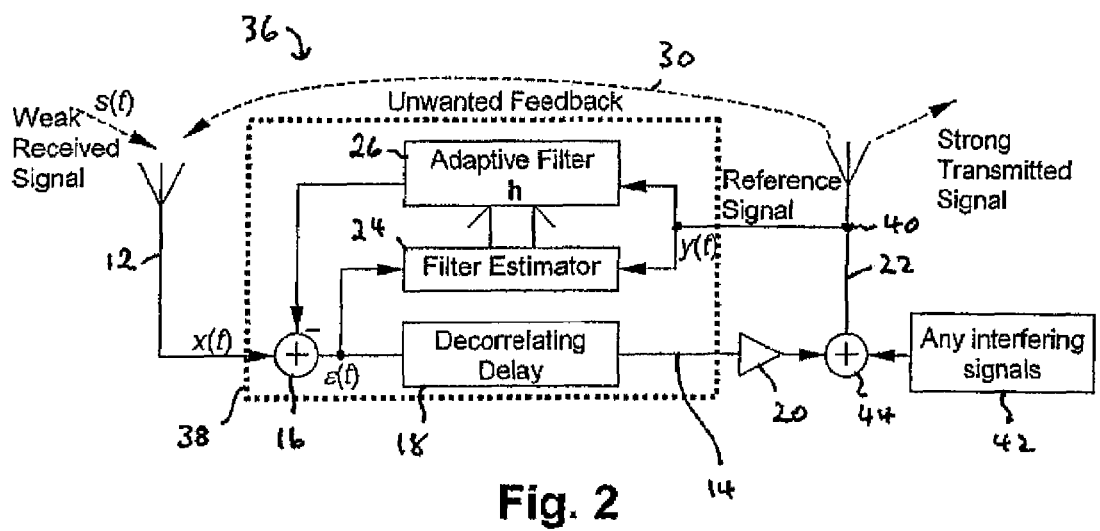
FIG. 2 is a corresponding block diagram of an on-channel repeater in accordance with the present invention.

The differences from FIG. 1 are first that in this case the reference signal, that is the input to the adaptive filter 26 and the reference input to the filter estimator 24, are taken not from within the processor 38 but rather from the transmitter antenna 22, as indicated at 40. That is to say, the reference signal is taken after the transmitter power amplifier. Secondly, the interfering signal on the adjacent channel, indicated at 42, is arranged to be transmitted on the same transmitting antenna as the transmitting antenna 22 used by the repeater, by virtue of the no-longer-notional combiner 44. The combiner may in fact be a coupler, or may be absent altogether if no adjacent channel transmitter is present. The system nevertheless still mitigates the effects of power amplifier intermodulation on the feedback cancellation process.

If the repeater is co-sited with one or more adjacent channel transmitters, by transmitting from the same antenna as the adjacent channel or channels, the reference input of the repeater can then readily be fed with a combined signal transmitted through the antenna that contains not only the wanted but also the adjacent channel. In this way not only can the principal linear feedback of the repeated channel be removed, but also the intermodulation products which are present in the interfering signal can be cancelled as well as those caused by the retransmission of the wanted signal, avoiding undesirable re-radiation.

Figure 3:
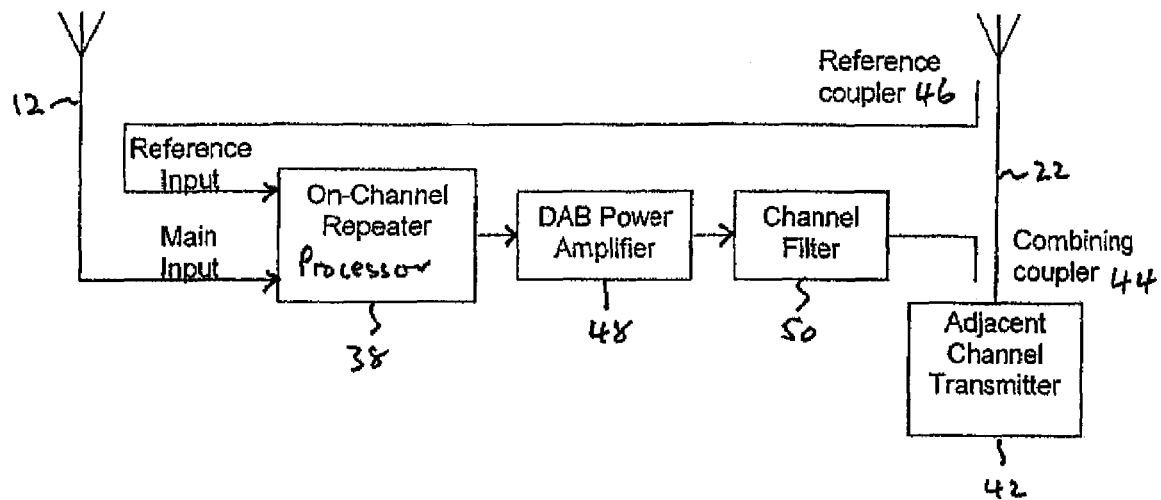
FIG. 3 illustrates in more detail a repeater station using the on-channel repeater shown in FIG. 2.

An example of an on-channel repeater station with external feedback then takes the form shown in FIG. 3, where the repeater processor 38 receives the outputs of the receiving antenna 12 and, via a reference signal coupler 46, a reference signal from the transmitting antenna 22. Assuming that this is a digital audio broadcasting (DAB) repeater, the signal passes from processor 38 to a DAB power amplifier and thence through a channel filter 50 to the transmitting antenna. It is fed into the transmitting antenna by a combining coupler 44. The antenna 22 is in fact the antenna for the transmitter for the adjacent channel which is causing the interference. It might be thought that the best solution would be to have the interfering signal transmitted from as far away as possible in the circumstances, but we have appreciated that if it uses the same antenna or is otherwise very close indeed, then the processor 38 will be able to cancel out the interference and the overall result is actually better.

FIG. 3 shows a low power repeater, where the repeated signal is much lower power (say 10 dB) than the adjacent channel. It should be noted that that the coupler 44 may be replaced by a frequency selective combiner in applications where high power of the repeated signal is needed. Indeed, the adjacent channel transmitters might themselves be repeaters.

Figure 6:
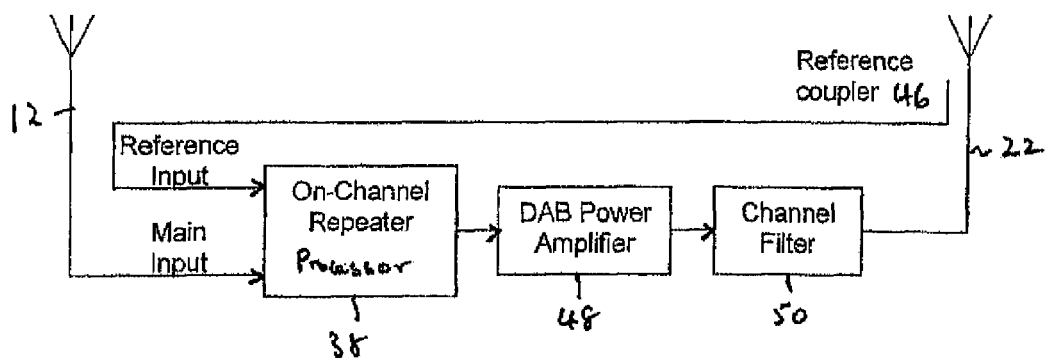
FIG. 6 is a block diagram similar to FIG. 3 of an on-channel repeater in the absence of an adjacent-channel transmitter.

As noted above, the combiner 44 in FIG. 3 may in fact be absent if no adjacent channel transmitter is present. Such an arrangement is illustrated in FIG. 6. The system nevertheless still mitigates the effects of power amplifier intermodulation on the feedback cancellation process and provides a significant improvement by taking the reference input from the transmitting antenna after the power amplifier 48 and not from the output of the delay 18 in the processor 28, as hitherto.

The theory of operation of the apparatus will now be described. The signals on FIG. 2 are appropriately labelled and used in the following.

The cancellation of the parasitic feedback in the repeater is performed by an adaptive finite impulse response filter, which models the path between the transmitting and receiving antennas. The filter impulse response h is estimated with the use of correlation, provided that the delay through the system is sufficiently long to avoid the effects of autocorrelation, and the delay 18 ensures this. In other words, the retransmitted signal, and hence the feedback, is uncorrelated with the received signal, so that it can be unambiguously identified. In fact, apart from delayed signals $\epsilon(t)$, the signal $y(t)$ may contain a number of interfering signals such as intermodulation products from the power amplifier or even intermodulation products from adjacent channels, if present.

The simplest, and in most cases entirely sufficient, method of estimating filter taps, is the Least Mean Square (LMS) algorithm. Given the input $x(t)$ and output $y(t)$, the objective is to minimize the error $\epsilon(t)$, which contains the received signal. This signal is recovered by subtracting from $x(t)$ the output $y(t)$ filtered by h, as shown below:

$$\epsilon(t) = x(t) - h^T y_t \quad (1)$$

Vector $y_t$ contains $y(t)$, $y(t-1)$ to $y(t-K-1)$ where K is the length of h. Ideally all remnants of $y(t)$ are removed from $x(t)$, and the energy in $\epsilon(t)$ is minimized. In order to achieve this goal the filter taps h must be estimated. First the expectation of squared magnitude of $\epsilon(t)$ is defined $$E|\epsilon(t)|^2 = E|x(t) - h^T y_t|^2 \quad (2)$$

and differentiated with respect to h:

$$\frac{dE|\epsilon(t)|^2}{dh} = -E\{y_t[x(t) - y_t^T h]^*\} \quad (3)$$
$$= -E[y_t \epsilon(t)^*]$$

The taps are then updated with an appropriately scaled conjugate of the instantaneous value of the derivative:

$$h_t = h_{t-1} + \lambda \epsilon(t) y_t^* \quad (4)$$

The value of λ is chosen as a compromise between the speed of convergence and signal to noise ratio. In practice, faster convergence allows the algorithm to follow rapid changes in the feedback path caused by Doppler paths and multiple reflections, at the expense of increased noise in the filter tap estimates h, which affects feedback cancellation. Similarly, in the case of slow convergence and in the presence of Doppler, ϵ(t) may contain a significant remnant of y(t), also causing instability. Because the level of this residual feedback is proportional to the loop gain of ϵ, the amount of Doppler variability in x(t) imposes an upper limit on the gain of the repeater.

The signal y(t) in FIG. 2 need not be related to the recovered signal ϵ(t). Indeed those two signals must not be correlated within the time period equal to the length of the adaptive filter.

As discussed in Marple, S. L. Jr., Digital Spectral Analysis with Applications, Prentice Hall, 1987, ISBN 0-13-214149-3, convergence also depends on the eigenvalues of the covariance matrix $R_{yy} = E(yy^*)$. Optimal behaviour occurs when all eigenvalues are equal, but if $R_{yy}$ is not full rank, or some eigenvalues are close to zero, convergence is significantly impaired. One of the consequences of poor convergence might be large amounts of noise generated in unused areas near the edges of the Nyquist band. For this reason, the choice of sampling rate has to be carefully addressed and best results are achieved if the input signal is noise-like in nature. In contrast, other algorithms such as Fast Recursive Least Squares (RLS) could be used to estimate the autocorrelation of the recovered signal, and that has assured convergence properties. Implementation of Fast RLS is however considerably more demanding of hardware resources.

The preferred DAB on-channel repeater embodying the invention will now be described in greater constructional detail with reference to FIG. 5. It is implemented as a single hardware unit with a 0 dBm output driver.

Figure 4:
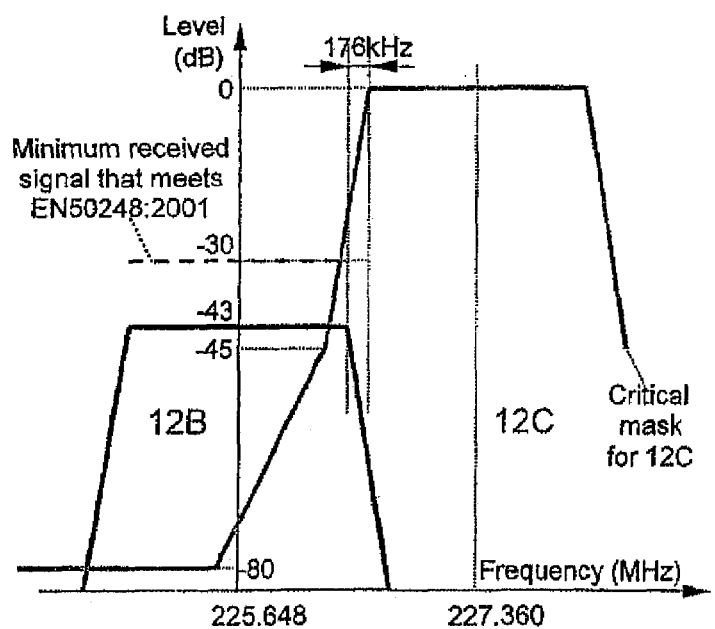
FIG. 4 (described above) is a spectral diagram illustrating typical requirements for such a repeater.
Figure 5:
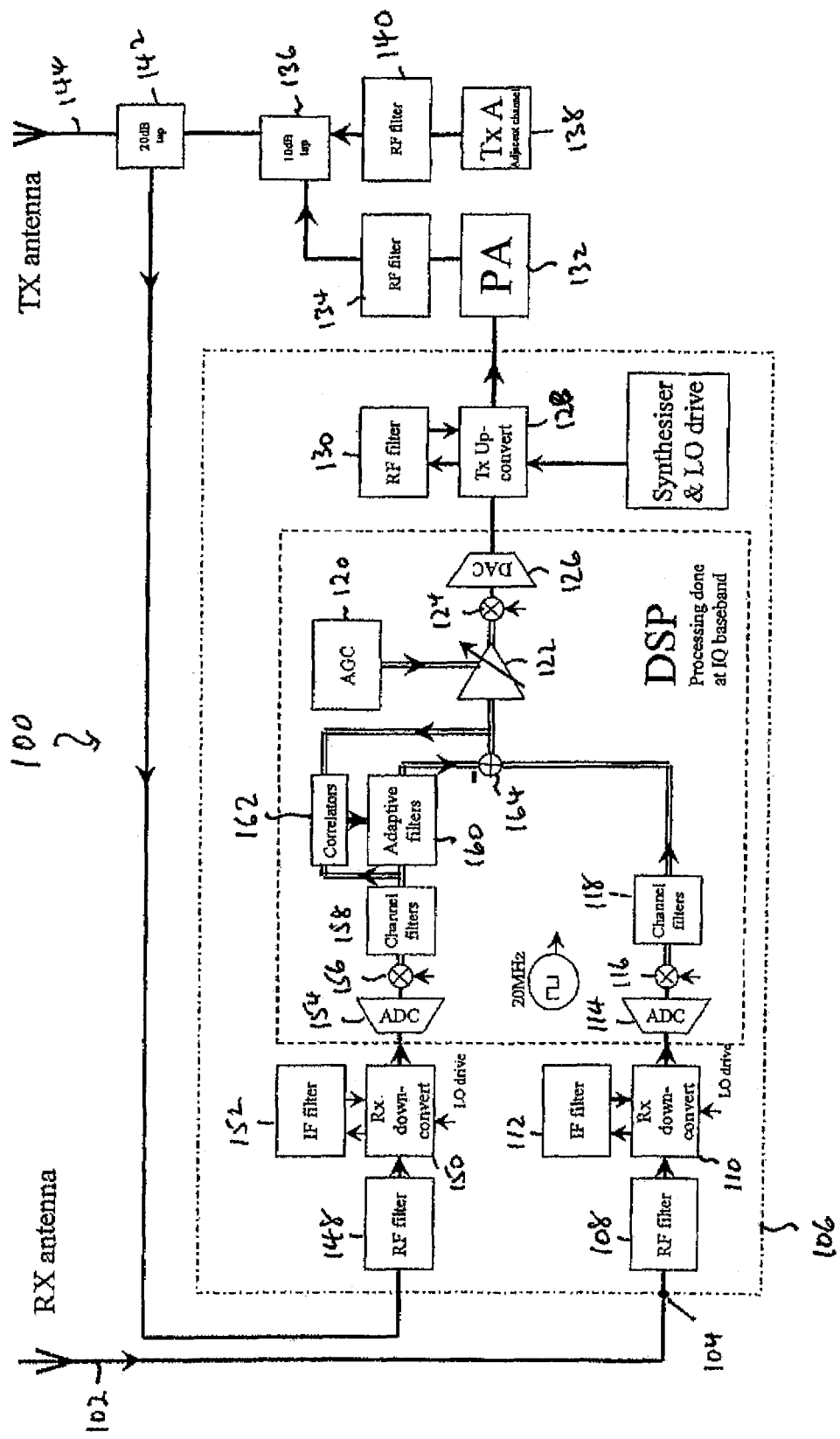
FIG. 5 is a more detailed block diagram of an on-channel repeater of the type shown in FIGS. 2 and 3.

In the on-channel repeater 100 shown in FIG. 5, the wanted DAB signal on Band III is received using a directional receiving antenna 102. The antenna output is fed into the main input 104 of the repeater processor unit 106. The first module is an RF filter 108 designed primarily to reject an image frequency before downconversion. A high level mixer 110 is then used to convert to a 20 MHz IF (intermediate frequency) where a high order LC IF filter 112 is applied to remove most of the energy of the adjacent channels. The received signal may be 'buried' under a signal some 30 dB stronger, as described with reference to FIG. 4. In addition the unfiltered remnants of the adjacent channels must also be accommodated in order to avoid clipping. Consequently, the design of the mixer and IF filter should ensure low distortion and high dynamic range within the wanted bandwidth before the signal is digitised. The signal is sampled by a 14-bit analogue-to-digital converter 114 running at 80 MHz so that the quantisation noise is spread over the entire Nyquist bandwidth of 40 MHz, resulting in the effective signal-to-noise ratio of around 96 dB with respect to full scale within the useful 1536 kHz bandwidth of a DAB signal.

Once in the digital domain, the signal is converted to complex baseband by a multiplier 116, filtered by channel filters 118, and subsampled (not separately shown) to 1.66 MHz. It should be noted that adjacent ensembles are separated by as little as 176 kHz, which imposes a sharp filter roll-off requirement, resulting in non-linear group delay performance of the repeater at the edge of the ensemble. There follows a feedback cancellation block 160, 162, 164 (see below) of the type described in our earlier applications, which renders the signal suitable for rebroadcasting. The output level is stabilised by an AGC module, comprising an AGC circuit 120 and amplifier 122, which is appropriately gated to avoid gain changes during the DAB null symbol. The signal is then upsampled, mixed up to an IF of 20 MHz in a mixer 124 and converted back to analogue in a 16-bit digital-to-analogue converter 126. All digital processing is performed in a single Field Programmable Gate Array (FPGA) device, which executes approximately 3 billion fixed-point multiplications per second. A further up-conversion in an upconverter 128 to Band III is followed by an image rejection band-pass filter 130 and a 0 dBm driver stage. This signal can then be routed to an external RF power amplifier 132 and RF channel filter 134. The signal is then applied to one input of a combiner 136. The output of a main transmitter 138 carrying the adjacent channel which also passes through an RF channel filter 140 is applied to the main input of the combiner 136. The combiner output is applied through a tap circuit 142 to the transmitter antenna 144. In an alternative arrangement, the signal from RF filter 136 is directly applied to the transmitting antenna.

The reference signal obtained from the coupler 142 in the antenna feed is processed in an identical manner to the main signal, as described above, up to and including the digital downconversion and filtering. That is, the first module, connected to the tap 142, is an RF filter 148 designed primarily to reject an image frequency before downconversion. A high level mixer 150 is then used to convert to a 20 MHz IF (intermediate frequency) where a high order LC IF filter 152 is applied. The signal is sampled by a 14-bit analogue-to-digital converter 154 running at 80 MHz, and once in the digital domain, the signal is converted to complex baseband by a multiplier 156, filtered by channel filters 158, and subsampled (not separately shown) to 1.66 MHz.

The next stage is the adaptive filter block which produces the cancellation signal subtracted from the main input. This is constructed as in our earlier applications. Briefly, it comprises adaptive filters 160 in the form of transversal filters which are controlled by correlators 162 which compare the input and output of the adaptive filters. The coefficient values of the filter taps can be calculated in an LMS estimator module. The output of the adaptive filters 160 is combined with the output of the channel filters 118 in the sense to cancel the unwanted feedback and interfering signals.

Although described in the context of DAB, the invention is applicable to many other types of signal, particularly those which are noise-like, including in particular DVB-T, CDMA and TDMA, and COFDM or OFDM generally.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. An on-channel repeater, comprising:
   a receiving antenna for receiving a first RF input signal on a first channel;
   a transmitting antenna for transmitting an RF signal having a frequency which is the same as a frequency of said first RF input signal;
   an amplification path between said receiving and transmitting antennas, said amplification path providing substantially linear processing, said amplification path including a decorrelating delay circuit having an input port and an output port;

a reference signal input for receiving a reference signal;

a filter estimator having a first input coupled to said reference signal input and having a second input coupled to the input port of said decorrelating delay circuit, and having an output, said filter estimator for producing a plurality of control coefficients;

an adaptive filter having a first input coupled to said reference signal input, having a second input coupled to the output of said filter estimator and having an output coupled to the input port of said decorrelating delay circuit, said adaptive filter controlled by said control coefficients to provide a modified signal at the adaptive filter output;

a combiner for combining said modified signal with the first RF input signal in said amplification path and providing the combined signal to said decorrelating delay circuit; and an RF amplifier disposed in said amplification path, said RF amplifier having an input coupled to the output of said decorrelating delay circuit and having an output coupled to said transmitting antenna, wherein said RF amplifier is disposed to receive said combined signal and to provide said combined signal to said transmitting antenna; and wherein said reference signal input for receiving said reference signal is coupled to said transmitting antenna after said RF amplifier such that said reference signal input is configured to provide to said filter estimator and said adaptive filter, a reference signal which includes intermodulation products generated by said RF amplifier and wherein in response to the combined signal provided thereto, said decorrelating delay circuit mitigates an effect of the intermodulation products generated by said RF amplifier.

2. The on-channel repeater according to claim 1, in which said coefficient producing means receives said reference signal as one input and the output of said combining circuit as another input.

3. The on-channel repeater according to claim 1, further comprising an RF signal source configured to provide a second, different RF signal to said transmitting antenna.

4. The on-channel repeater of claim 3, wherein said RF signal source corresponds to an adjacent channel transmitter configured to provide the second RF signal to said transmitting antenna on a channel adjacent to the first channel.

5. The on-channel repeater according to claim 1, in which the output of said RF amplifier is applied to said transmitting antenna through a coupler.

6. The on-channel repeater according to claim 1, in which said reference signal input is coupled to said transmitting antenna by a coupler.

7. The on-channel repeater according to claim 1, in which said on-channel repeater is operative with OFDM signals.

8. The on-channel repeater according to claim 1, in which said on-channel repeater is a DAB repeater.

9. An on-channel repeater comprising:
a receiving antenna for receiving an RF input signal;
a transmitting antenna for transmitting a signal on the same frequency as said input signal;
an amplification path between said receiving and transmitting antennas, said amplification oath providing substantially linear processing, said amplification path including a decorrelating delay circuit;
a reference signal input for receiving a reference signal;

means coupled to said reference signal input for producing a plurality of control coefficients;

an adaptive filter coupled to said reference signal input and controlled by said control coefficients to provide a modified signal;

a combiner for combining said modified signal with said signal in said amplification path so as to reduce the effect of feedback;

an amplifier in said amplification path receiving said combined signal and applying it to said transmitting antenna; and a further transmitter having an output coupled to said transmitting antenna, said further transmitter transmitting through said transmitting antenna a potentially interfering signal on a channel which is adjacent the first channel;

wherein said input for receiving said reference signal is coupled to said transmitting antenna after said power amplifier such as to receive any inter-modulation products from said transmitting antenna and any potentially interfering signal from said further transmitter.

10. The on-channel repeater according to claim 9, in which said coefficient producing means receives said reference signal as one input and the output of said combining circuit as another input.

11. The on-channel repeater according to claim 9, in which the output of said power amplifier is applied to said transmitting antenna through a coupler.

12. The on-channel repeater according to claim 9, in which said reference signal input is coupled to said transmitting antenna by a coupler.

13. An on-channel repeater, comprising:
a receiving antenna for receiving an RF input signal;
a transmitting antenna for transmitting a signal on the same frequency as said input signal;
an amplification path between said receiving and transmitting antennas, said amplification path providing substantially linear processing, said amplification path including a decorrelating delay circuit having an input port and an output port;
a reference signal input for receiving a reference signal;
a control coefficient generator coupled to said reference signal input for producing a plurality of control coefficients;
an adaptive filter coupled to said reference signal input and controlled by said control coefficients to provide a modified signal;
a combiner for combining said modified signal with said signal in said amplification path so as to reduce the effect of feedback; and
an RF amplifier in said amplification path receiving said combined signal and applying it to said transmitting antenna;
wherein said reference signal input is coupled to said transmitting antenna after said RF amplifier so as to receive any inter-modulation products from said RF amplifier and wherein said reference signal input is coupled to the input of said decorrelating delay circuit and the output of said decorrelating delay circuit is coupled to an input of said RF amplifier.

14. The on-channel repeater according to claim 13, in which said control coefficient generator receives said reference signal as one input and an output of said combining circuit as another input.

15. The on-channel repeater according to claim 13, further comprising an RF signal source configured to provide a second RF signal to said transmitting antenna wherein the second RF signal is on a channel which is different that a channel on which the first RF signal is provided.

16. The on-channel repeater of claim 15 wherein said RF signal source corresponds to an adjacent channel transmitter configured to provide the second RF signal to said transmitting antenna on a channel adjacent to the first channel.

17. The on-channel repeater according to claim 13, in which the output of said power amplifier is applied to said transmitting antenna through a coupler.

18. The on-channel repeater according to claim 13, in which said reference signal input is coupled to said transmitting antenna by a coupler.

19. The on-channel repeater according to claim 13, in which said on-channel repeater is operative with OFDM signals.

20. The on-channel repeater according to claim 13, in which said on-channel repeater is a DAB repeater.

21. An on-channel repeater comprising:
 a receiving antenna for receiving a first RF input signal on a first channel;
 a transmitting antenna for transmitting a signal on a frequency which is the same frequency as said first RF input signal on the first channel;
 an amplification path between said receiving and transmitting antennas, said amplification path providing substantially linear processing, said amplification path including a decorrelating delay;
 a reference signal input for receiving a reference signal;
 a control coefficient generator coupled to said reference signal input for producing a plurality of control coefficients;
 an adaptive filter coupled to said reference signal input and controlled by said control coefficients to provide a modified signal;
 a combiner for combining said modified signal with said signal in said amplification path so as to reduce the effect of feedback; and
 an amplifier in said amplification oath receiving said combined signal and applying it to said transmitting antenna;
 an RF signal source which transmits a second RF signal on a second channel which is different from the first channel, said second RF signal source being coupled to said transmitter antenna for transmission of the second RF signal;
 wherein said input for receiving said reference signal is coupled to said transmitting antenna after said power amplifier such as to receive any inter-modulation products from said transmitting antenna and any potentially interfering signal from said further transmitter.

22. The on-channel repeater according to claim 21, in which said control coefficient generator receives said reference signal as one input and an output of said combining circuit as another input.

23. The on-channel repeater according to claim 21, in which the output of said power amplifier is applied to said transmitting antenna through a coupler.

24. The on-channel repeater according to claim 21, in which said reference signal input is coupled to said transmitting antenna by a coupler.

25. An on-channel repeater, comprising:
 a receive antenna having a receive antenna port, said receive antenna configured to receive a first RF signal on a first channel;
 an on-channel repeater processor having a first input coupled to the receive antenna port and having a first output;
 an RF amplifier having an input port coupled to the output port of said on-channel repeater processor and having an output port;
 a transmit antenna having a transmit antenna port coupled to the output port of said RF amplifier, said transmit antenna configured to emit an RF output signal having a frequency which is the same as a frequency of the RF input signal on the first channel;
 an RF signal source coupled to the transmit antenna port of said transmit antenna, said RF signal source configured to provide to said transmit antenna an RF input signal on a second different channel; and
 a reference signal circuit having a first port coupled between the output of said RF amplifier and the transmit antenna port and having a second port coupled to an input of said on-channel repeater processor, said reference signal circuit configured to provide a reference signal to said on-channel repeater processor.

26. The on-channel repeater of claim 25 further comprising a channel filter disposed between said RE amplifier and said transmit antenna, said channel filter having an input port coupled to the output port of said RF amplifier and having an output port coupled to the transmit antenna port.

27. The on-channel repeater of claim 26 wherein said RF signal source corresponds to an adjacent channel transmitter configured to provide the second RF signal to said transmitting antenna on a channel adjacent to the first channel.

28. The on-channel repeater of claim 25 wherein said on-channel repeater processor further comprises:
 a decorrelating delay circuit having an input port coupled to the input port of said on-channel repeater processor and having an output port coupled to the output port of said on-channel repeater processor;
 a filter estimator having a first input to receive said reference signal, having a second input and having an output, said filter estimator configured to generate one or more control coefficients in response to signals provided thereto;
 an adaptive filter configured to receive said reference signal and to receive the one or more control coefficients from said filter estimator and in response to said control coefficients to provide a modified signal at an output thereof; and
 a combiner having a first input port coupled to the output of said adaptive filter, having a second input port coupled to receive the first RF signal on the first channel and having an output port coupled to the input of said decorrelating delay circuit and to the second input of said filter estimator, said combiner for combining the modified signal with the RF input signal on the first channel so as to reduce the effect of feedback.

* * * * *

UNITED STATES PATENT AND TRADEMARK OFFICE
CERTIFICATE OF CORRECTION

PATENT NO. : 7,627,287 B2
APPLICATION NO. : 11/419059
DATED : December 1, 2009
INVENTOR(S) : Peter Neil Moss It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Twenty-first Day of December, 2010

David J. Kappos
*Director of the United States Patent and Trademark Office*